US006765762B2

(12) United States Patent
Yanagihara

(10) Patent No.: US 6,765,762 B2
(45) Date of Patent: Jul. 20, 2004

(54) DISK DRIVE WITH A PARKING RAMP FOR PARKING HEADS

(75) Inventor: Shigeki Yanagihara, Tokorazawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/092,527

(22) Filed: Mar. 8, 2002

(65) Prior Publication Data

US 2002/0131212 A1 Sep. 19, 2002

(30) Foreign Application Priority Data

Mar. 19, 2001 (JP) ........................................ 2001-079197

(51) Int. Cl.[7] .............................. G11B 5/54; G11B 21/22
(52) U.S. Cl. ................................ 360/254.8; 360/254.7
(58) Field of Search .......................... 360/254.3, 254.4, 360/254.7, 254.8

(56) References Cited

U.S. PATENT DOCUMENTS

| 4,933,785 | A | * | 6/1990 | Morehouse et al. ...... 360/78.04 |
| 5,231,549 | A | * | 7/1993 | Morehouse et al. .......... 360/75 |
| 5,453,889 | A |   | 9/1995 | Alt ........................... 360/97.01 |
| 5,757,587 | A | * | 5/1998 | Berg et al. ................ 360/254.7 |
| 5,864,448 | A | * | 1/1999 | Berberich ................ 360/254.8 |
| 5,898,545 | A |   | 4/1999 | Schirle .................... 360/97.02 |
| 6,055,134 | A | * | 4/2000 | Boutaghou ............... 360/254.4 |
| 6,122,130 | A |   | 9/2000 | Boutaghou et al. ........... 360/75 |
| 6,212,029 | B1 | * | 4/2001 | Fioravanti ................ 360/97.01 |
| 6,538,851 | B1 | * | 3/2003 | Sasaki ..................... 360/254.8 |
| 6,583,963 | B2 | * | 6/2003 | Boutaghou ............... 360/254.7 |

FOREIGN PATENT DOCUMENTS

JP          2002-109842 A  *  4/2002

OTHER PUBLICATIONS

US 6,091,569, 7/2000, Allsup et al. (withdrawn)

* cited by examiner

Primary Examiner—Jefferson Evans
(74) Attorney, Agent, or Firm—Pillsbury Winthrop LLP

(57) ABSTRACT

Disclosed herein is a disk drive that has heads and a loading/unloading mechanism including a parking ramp. The parking ramp is so structured that it is likely to contact the outermost area of a disk, never contacting or hitting the loading/unloading area of the disk, when the disk drive receives an external shock. The outermost area of the disk remains unused to record data or park the heads.

2 Claims, 4 Drawing Sheets

DISK DRIVE WITH A PARKING RAMP FOR PARKING HEADS

CROSS-REFERENCE TO RELATED APPLICATIONS

This application is based upon and claims the benefit of priority from the prior Japanese Patent Application No. 2001-079197, filed Mar. 19, 2001, the entire contents of which are incorporated herein by reference.

BACKGROUND OF THE INVENTION

1. Field of the Invention

The present invention relates generally to the field of disk drives, and more particularly to a disk drive in which the parking ramp is prevented from contacting a surface of a disk even when the disk drive receives vibration or shocks.

2. Description of the Related Art

In disk drives, a representative example of which is a hard disk drive, a head (more precisely, a slider having a magnetic head element mounted on it) reads data from and writes data on a surface of a disk, i.e., a data-recording medium. Each head is mounted on an actuator comprising a voice coil motor (VCM) that is a main component. The actuator moves the head to a target position over the surface of the disk, under the control of a micro-controller (CPU). More specifically, the actuator moves the head to a position at which the head should read or write data from and on the data-recording area of the disk. The disk is rotated by a spindle motor.

A type of a disk drive is known, which comprises a loading/unloading mechanism (also known as "ramp loading mechanism"). The loading/unloading mechanism is configured to park the head outside the disk during any non-operation period. During the non-operation period, the head neither reads nor writes data from or on the disk. The non-operating period includes a period during which the disk drive is activated, a period during which the power switch of the disk drive remains off, and a period during which data is transferred from the disk drive to the host system.

As FIG. 5A shows, the loading/unloading mechanism has a parking ramp 20 that is a member for parking the head 2. Parking ramps of various structures are available. Nonetheless, every parking ramp is designed to hold the head 2 unloaded from the surface of the disk 1 and to load the head 2 above the surface of the disk 1. More specifically, the parking ramp 20 has inclined surfaces 20A and horizontal surfaces 20B as is illustrated in FIG. 5B. Either inclined surface 20B may support an actuator. The horizontal surfaces 20B oppose each other, with an outer peripheral part of the disk 1 lying between them.

As FIG. 5A shows, too, the actuator has a suspension 3 that holds the head 2. The distal end of the suspension 3 functions as a parking tab 30. To achieve the unloading of the head 2, the actuator moves from any position over the disk 1 toward the outer periphery of the disk 1, until it reaches the marking ramp 20. The parking tab 30 then rides onto the inclined surface 20A of the parking ramp 20 and is lifted upwards. The head 2 held by the suspension is therefore parked at a prescribed distance from the surface of the disk 1.

As illustrated in FIG. 4B, the disk 1 has, on one surface, a data-recording area 10A, a loading/unloading area 10B and an outermost area 10C. The data-recording area 10A is a circular region, extending for some distance in the radial direction, from the center of the disk 1 toward the outer periphery thereof. The loading/unloading area 10B is an annular region that surrounds the data-recording area 10A. The outermost area 10C is an annular region, too, which surrounds the loading/unloading area 10B and usually remains unused.

In the loading/unloading area 10B, the actuator parks the head 2 on the parking ramp 20, accomplishing the unloading of the head 2. The actuator moves the head 2 from the parking ramp 20 to the loading/unloading area 10B to achieve the loading of the head 2. Namely, the actuator moves the head 2 between the data-recording area 10A and the loading/unloading area 10B.

The loading/unloading mechanism can maintain keep the head 2 out of contact with the disk 1 during the non-operating period that includes the period of activating the disk drive. This helps to improve the surface condition (surface smoothness) of the disk 1, successfully decreasing the flying height of the head 2. In other words, the distance between the disk 1 and the head 2 can be reduced to position the magnetic head element at a short distance from the surface of the disk 1. As a result, it is possible to enhance the read/write characteristic of the head 2. Hence, the density at which the head 2 record data on the disk 1 increases.

When the disk drive receives external vibration or mechanical shocks, it vibrates, inevitably undergoing deflection. Consequently, a part of the disk 1 (particularly, the outer peripheral part) may contact or hit a part (particularly, the distal part) of the upper horizontal surface 20B of the parking ramp 20, as can be understood from FIG. 4A. If the parking ramp 20 frequently contacts the loading/unloading area 10B of the disk 1, the following problem will arise.

As the parking ramp 20 repeatedly contacts the loading/unloading area 10B, the surface of the disk 1 is damaged and scratched, generating dust or forming projections on the disk 1 in some cases. The head 2, which remains at a low flying height above the loading/unloading area 10B, is very likely to contact the dust or the projections. If the head 2 contacts the dust or the projections, it will be damaged.

It is therefore necessary to prevent, as much as possible, the parking ramp 20 from contacting the loading/unloading area 10B of the disk 1 even if the disk drive receives external vibration or shocks. The parking ramp 20 scarcely contacts the data-recording area 10A. This is because the data-recording area 10A, which is the most important surface area of the disk 1, lies outside the region in which the parking ramp 20 is located.

A disk drive that comprises a stopper or an arm has been proposed, as is disclosed in U.S. Pat. Nos. 5,453,889 and 6,091,569. The stopper or the arm controls the deflection of the disk or protects the data-recording area of the disk when the disk drive receives external vibration or shocks. However, neither the stopper nor the arm can prevent the parking ramp 20 from contacting or hitting the loading/unloading area 10B of the disk 1 when the disk drive receives external vibration or shocks.

BRIEF SUMMARY OF THE INVENTION

An object of the present invention is to provide a disk drive comprising a parking ramp, in which the parking ramp is prevented from contacting a disk, particularly the loading/unloading area thereof even if the disk drive receives external vibration or shocks.

In accordance with one aspect of the present invention, there is provided a disk drive including a parking ramp that is configured to avoid contact with the loading/unloading area provided on the surface of a disk.

The disk drive comprises: a spindle motor; a disk which has a data-recording area, a loading/unloading area and an outermost area and which is rotated by the spindle motor; an actuator which holds a head for reading and writing data on and from the disk, which moves the head over the disk and which performs loading/unloading of the head; and a parking ramp member which is arranged near the outermost area of the disk, which has a parking part and a surface. The parking part of the ramp member is configured to hold a part of the actuator while the head is being unloaded from the data-recording area. The surface of the ramp member faces the loading/unloading area and outermost area of the disk and is spaced therefrom by a prescribed distance. The surface of the parking ramp member is spaced from the loading/unloading area of the disk by a first distance and from the outermost area of the disk by a second distance that is shorter than the first distance.

DETAILED DESCRIPTION OF THE INVENTION

Embodiments of this invention will be described, with reference to the accompanying drawings.

(Disk Drive)

Figure 2:
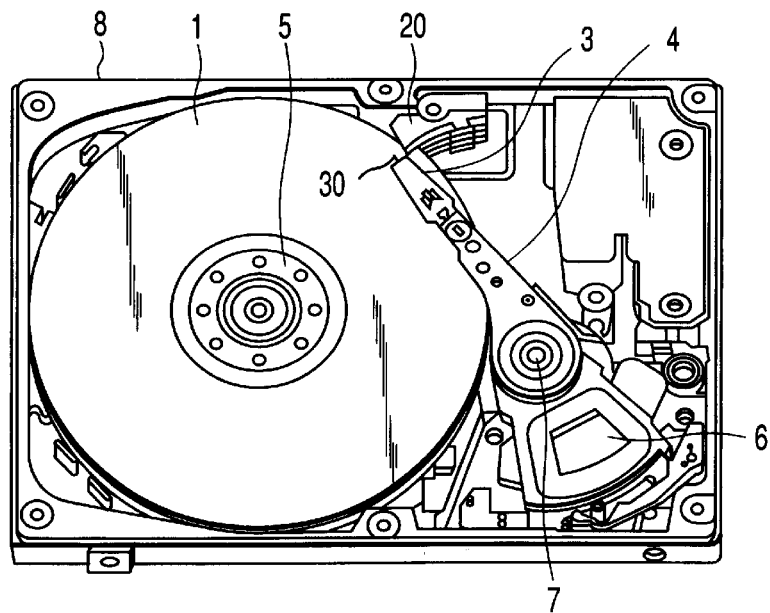
FIG. 2 is a plan view illustrating the major components of the disk drive.

FIG. 2 shows a disk drive, which is an embodiment of the present invention. As shown in FIG. 2, the disk drive comprises a loading/unloading mechanism that includes a parking ramp 20. The disk drive further comprises a spindle motor 5, a housing 8 and a head-disk assembly. The head-disk assembly includes disks 1, heads 2 and an actuator 4. The disks 1, actuator 4, spindle motor 5 and the parking ramp 20 are provided in the housing 8.

Figure 4A:
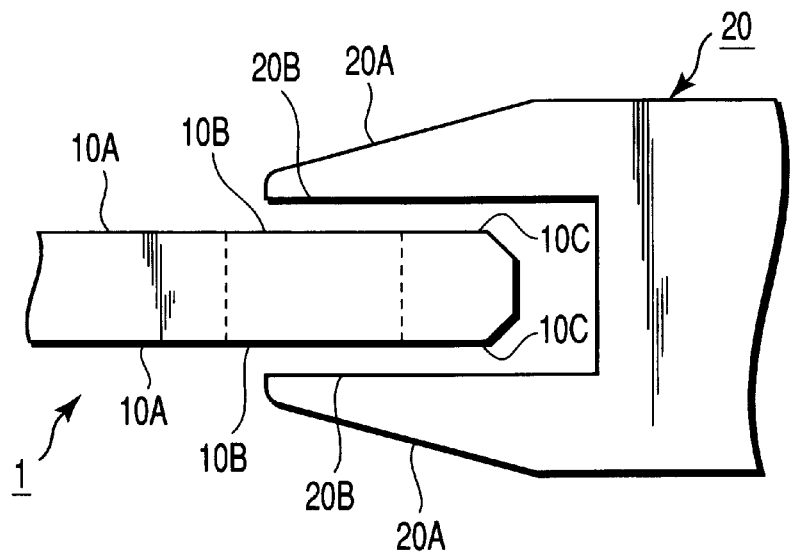
FIG. 4A is a side view showing a conventional parking ramp.
Figure 4B:
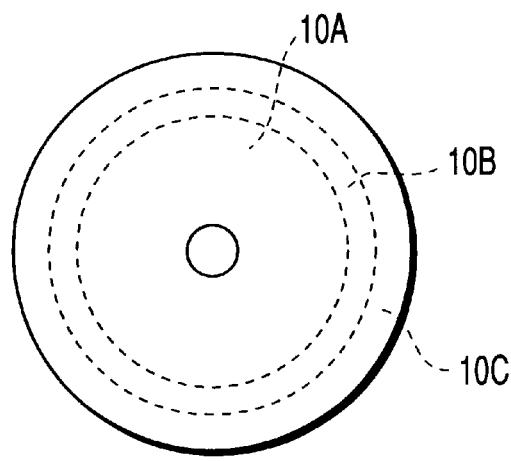
FIG. 4B is a plan view of a conventional disk.
Figure 5A:
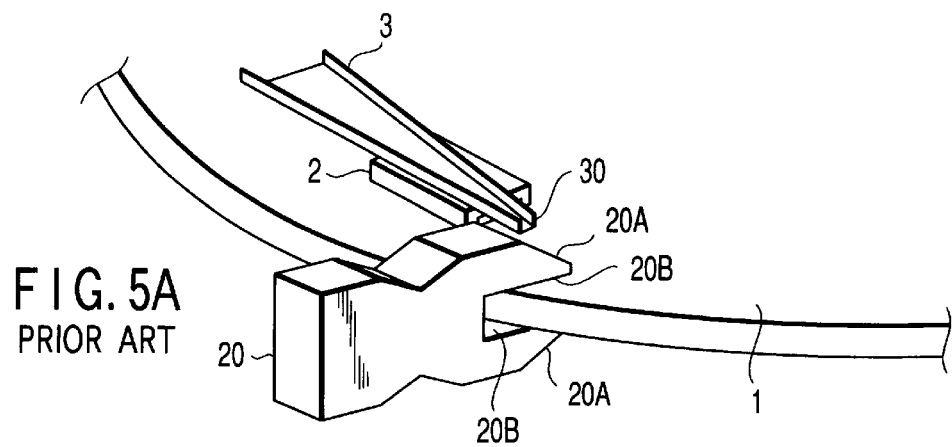
FIGS. 5A and 5B are a perspective view and a side view, respectively, each illustrating the positional relation between the conventional disk and the conventional parking ramp.
Figure 5B:
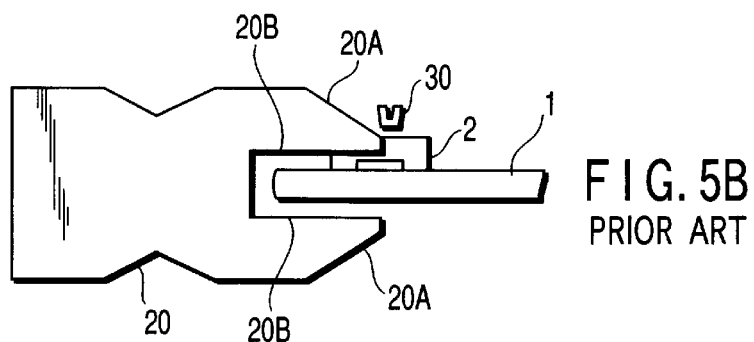

In operation, the spindle motor (SPM) 5 rotates the disks 1. Each disk 1 has a number of concentric tracks on each surface. As FIG. 4B shows, the disk 1 has, on each surface, a data-recording area 10A, a loading/unloading area 10B and an outermost area 10C. The data-recording area 10A is a circular region that extends for some distance in the radial direction, from the center of the disk 1 toward the outer periphery thereof. The loading/unloading area 10B is an annular region that surrounds the data-recording area 10A. The outermost area 10C is an annular region, too, which surrounds the loading/unloading area 10B and which usually remains unused to record data or park the head 2.

The actuator 4 moves each head 2 to the parking ramp 20, thus accomplishing the unloading of the head 2. The actuator 4 moves the head 2 from the parking ramp 20 to the loading/unloading area 10B to achieve the loading of the head 2. That is, the actuator 4 moves the head 2 between the data-recording area 10A and the loading/unloading area 10B.

The actuator 4 has suspensions 3 that hold the heads 2. (The head 2 is a slider that has a magnetic head element mounted on it.) The distal end of the suspension 3 functions as a parking tab 30. The actuator 4 is mounted on a shaft 7 and can be rotated around the shaft 7 when driven by a voice coil motor (VCM) 6. When the actuator 4 is rotated around the shaft 7, its distal end moves over the disk 1, in the axial direction of the disk 1.

(Parking Ramp)

As FIG. 2 shows, the parking ramp 20 is located outside the region in which the data-recording area 10A of the disk 1 lies. The parking ramp 20 is configured to park the head (i.e., the slider) on the actuator 4 in the loading/unloading area 10B.

Figure 1:
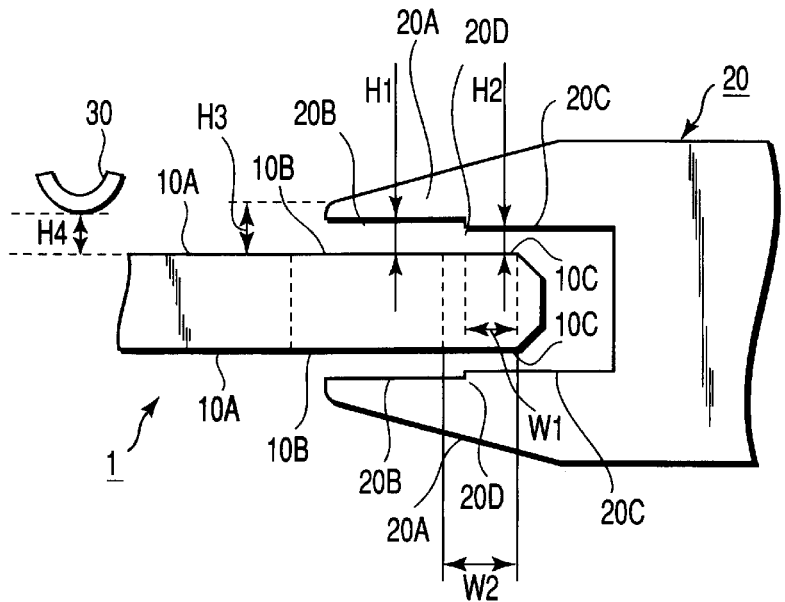
FIG. 1 is a side view showing the parking ramp provided in a disk drive according to an embodiment of the invention.
Figure 3A:
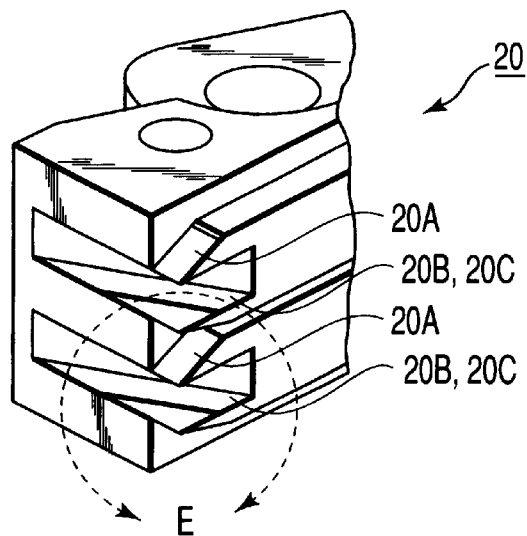
FIG. 3A is a perspective view depicting a part of the parking ramp.
Figure 3B:
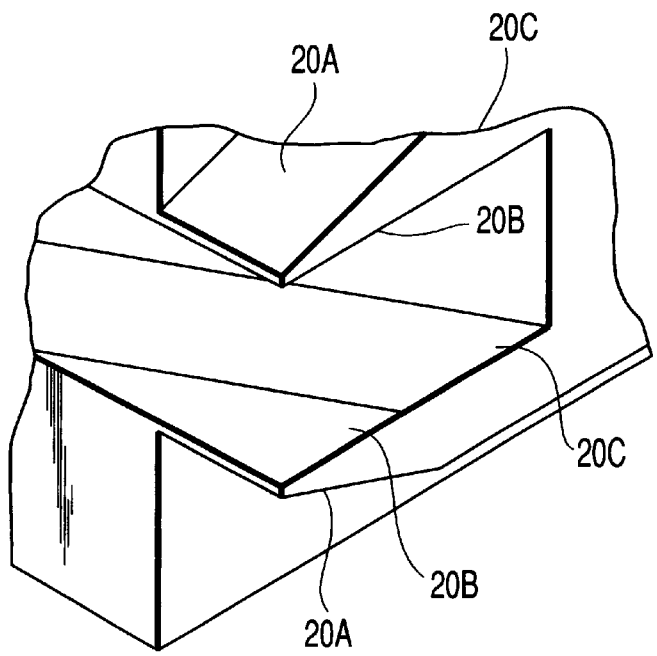
FIG. 3B is a magnified view of the part of the parking ramp, which is shown in FIG. 3A.

As FIG. 1 and FIG. 3A show, the parking ramp 20 is a member formed by, for example, plastic molding. The parking ramp 20 has inclined surfaces 20A and horizontal surfaces. Either inclined surface 20A may support the tab 30 of the actuator 4. The horizontal surfaces oppose each other, with an outer peripheral part of the disk 1 lying between them. FIG. 3A is a perspective view of the parking ramp 20. FIG. 3B is a magnified side view illustrating a part of the parking ramp 20.

The parking tab 30 of the actuator 4 rides onto one of the inclined surface 20A, more precisely the upper inclined surface 20A and held thereon to park the head 2 held on the suspension 3, at a prescribed distance from the surface of the disk 1. As FIG. 1 shows, each horizontal surface consists of two horizontal surfaces 20B and 20C. The first horizontal surface 20B faces the loading/unloading area 10B of the disk 1 and a part of the outermost area 10C thereof. The second horizontal surface 20C faces the remaining part of the outermost area 10C of the disk 1. A step 20D is provided at the junction between the parts 20B and 20C of the horizontal surface. Due to the step 20D, the gap (first gap H1) between the first part 20B of the horizontal surface and the loading/unloading area 10B is larger than the gap (second gap H2) between the second horizontal surface 20C and the outermost area 10C of the disk 1. (Thus, H1>H2.) The step 20D (H1−H2) depends on the smoothness and dimensional tolerance of the first horizontal surface 20B and that of the second horizontal surface 20C. The step 20D ranges, for example, from 10 μm to 50 μm, preferably about 20 μm.

If the disk drive is a 2.5-inch HDD, height H1, or a distance from the surface of the disk 1 to the distal end of the parking ram 20, is set at a value of about 0.27 mm, for the following reason. The height H1 increases to 0.47 mm if the disk 1 deflects downwards by about 0.20 mm when an external shock is applied to the disk drive. The height H4 of the tab 30, from the surface of the disk 1 is about 0.48 mm. Thus, the height H1 must be about 0.27 mm to make the parking tab 30 ride onto the upper inclined surface 20A of the parking ramp 20 even if the disk 1 deflects about 0.20 mm downwards due to the external shock.

The second gap H2 (i.e., the gap between the second horizontal surface 20C and the outermost area 10C of the disk 1) must be about 0.22 mm. If the step 20D exceeds 50 μm (=0.05 mm), the second gap H1 (i.e., the gap between the first horizontal surface 20B and the loading/unloading area 10B) will exceed 0.27 mm. As a consequence, the distal end of the ramp 20 will lie above the parking tab 30 if the disk 1 deflects when the disk drive receives an external shock. In this case, the parking tab 30 may not ride onto the parking ramp 20.

It is desired that the distance W1 from the circumference of the disk 1 to the step 20D be about 0.35 mm or a little longer. If the distance W1 is less than 0.35 mm, the circumference of the disk 1 may be close to the step 20D of the ramp 30, because the parking ramp 20 is located at a specific distance from the axis of the spindle motor 5. The maximum displacement allowable for the disk 1 with respect to the parking ramp 20 is 0.15 mm. Thus, the disk 1 would not contact the step 20D at its outermost area 10C since the distance W1 is at least about 0.35 mm. Note that the distance W2 between the outer circumference of the loading/unloading area 10B and the outer circumference of the outermost area 10C is about 0.5 mm.

(Advantage of the Embodiment)

When an external shock is applied to the disk drive described above, the disk 1 vibrates (or deflects) mainly in its axial direction. At this time, the disk 1 may contact or hit the second horizontal surface 20C of the parking ramp 20. This is because the distance between the disk 1 and the second horizontal surface 20C is shorter than the distance between the disk 1 and the first horizontal surface 20B.

In other words, the outermost area 10C of the disk 1 may contact or hit the second horizontal surface 20C of the parking ramp 20 when the disk 1 vibrates due to the external shock applied to the disk drive. Nonetheless, the loading/unloading area 10B of the disk 1 is prevented from contacting or hitting the first horizontal surface 20A, which is more spaced from the disk 1 than the second horizontal surface 20B. The data-recording area 10A of the disk 1 would not contact or hit the parking ramp 20 at all, just because it lies outside the parking ramp 20.

In short, the parking ramp 20 is positioned such that the ramp 20 may contact or hit the outermost area 10C of the disk 1 but would not contact or hit the loading/unloading area 10B, when the disk drive receives an external shock. Hence, the parking ramp 20 would not damage the loading/unloading area 10B to generate dust or form projections. There is no risk that the head 2 may contact such dust or such projections even if it remains at a low flying height above the loading/unloading area 10B. The head 2 can, therefore, be smoothly and reliably loaded from the loading/unloading area 10B to any desired position over the data-recording area 10A and unloaded from the data-recording area 10A to the loading/unloading area 10B.

(Modification)

Figure 6:
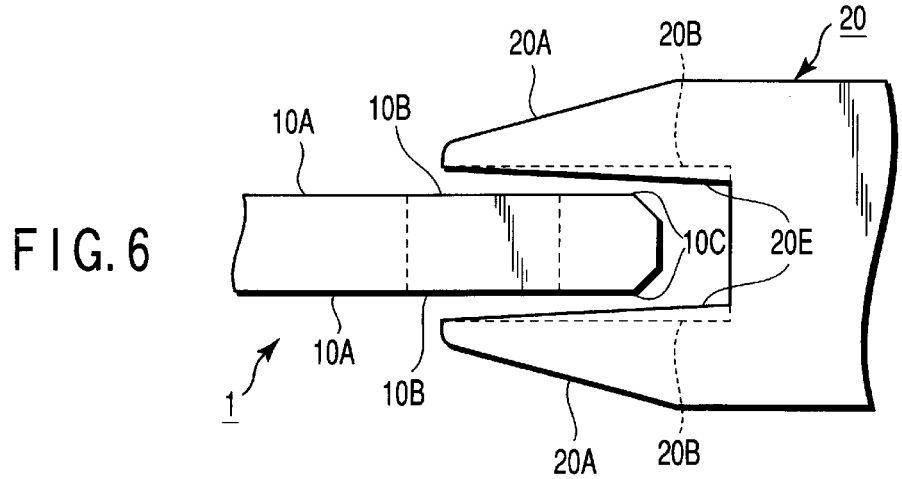
FIG. 6 is a side view depicting a modification of the parking ramp that is shown in FIG. 1.

FIG. 6 depicts a modification of the parking ramp 20 that is shown in FIG. 1.

As FIG. 6 shows, the parking ramp 20 of the modified embodiment has two inclined surfaces 20E that oppose the surfaces of a disk 1, respectively. Either surface 20E is inclined tapered at a predetermined taper angle to the surface of the disk 1. More specifically, the surface 20E is so inclined that the gap between it and the disk 1 gradually decrease toward the circumference of the disk 1. Therefore, the gap between the surface 20E and the outermost area 10C of the disk 1 is smaller than the gap between the surface 20E and the loading/unloading area 10B of the disk 1.

With the modified parking ramp 20 shown in FIG. 6, the outermost area 10C of the disk 1 is far more likely to contact the surface 20E than the loading/unloading area 10B when the disk drive receives an external shock. This protects the unloading/loading area 10B. In this regard, it should be noted that the outermost area 10C remains unused to record data or park the head 2.

As has been described in detail, the present invention can provide disk drives, each comprising a loading/unloading mechanism with a parking ramp. Even when each disk drive receives an external shock, the parking ramp, in particular, is prevented from contacting or hitting the loading/unloading area or data-recording area of the disk. The loading/unloading area of the disk is therefore protected from damages. As a result, the parking ramp can perform stable loading and unloading of the head with respect to the disk.

What is claimed is:

1. A disk drive comprising:

a spindle motor;

a disk which has a data-recording area, a loading/unloading area and an outermost area and which is rotated by the spindle motor;

an actuator which holds heads for reading and writing data on and from the disk, which moves the head over the disk and which performs loading/unloading of the heads; and a parking ramp member which is arranged near the outermost area of the disk, which has a parking part and a surface facing the disk, said parking part configured to hold a part of the actuator while the heads are being unloaded from the data-recording area, said surface being inclined such that a gap between the surface and the disk gradually decreases from the loading/unloading area to the outermost area.

2. A disk drive according to claim 1, wherein the outermost area of the disk contacts said surface of the parking ramp member when the disk is displaced in the axial direction, thereby preventing the loading/unloading area of the disk from contacting the parking ramp member.

* * * * *